United States Patent [19]

Lee

[11] Patent Number: 5,597,093
[45] Date of Patent: Jan. 28, 1997

[54] PUSH PAD UNIT FOR DISPENSING FLUIDS

[76] Inventor: Gary K. Lee, 5827 S. 81st East Pl., Tulsa, Okla. 74145

[21] Appl. No.: 394,132

[22] Filed: Feb. 24, 1995

[51] Int. Cl.⁶ .............................. B67D 3/02; G01F 11/02
[52] U.S. Cl. .................. 222/113; 222/146.6; 222/135; 222/181.2; 222/183; 222/207; 222/214
[58] Field of Search .................. 222/113, 129, 222/132, 135, 146.6, 181.1, 181.2, 181.3, 183, 207, 214

[56] References Cited

U.S. PATENT DOCUMENTS

| | | | |
|---|---|---|---|
| 2,541,352 | 2/1951 | Ginter | 222/113 X |
| 2,746,646 | 5/1956 | Hall | 222/113 |
| 4,349,133 | 9/1982 | Christine | 222/214 X |
| 4,515,294 | 5/1985 | Udall | 222/183 X |
| 4,773,569 | 9/1988 | Larsson | 222/207 X |
| 4,804,118 | 2/1989 | Mullen et al. | 222/146.6 X |
| 4,946,075 | 8/1990 | Lundback | 222/207 X |
| 4,961,508 | 10/1990 | Weimer et al. | 222/214 X |
| 5,333,758 | 8/1994 | Jamison et al. | 222/214 X |
| 5,524,795 | 6/1996 | Lee | 222/207 |

*Primary Examiner*—Kevin P. Shaver
*Attorney, Agent, or Firm*—Catalano, Zingerman & Associates

[57] ABSTRACT

This is a dispensing unit for condiments such as mustard, catsup, etc. or industrial liquids such as soap, chemicals. The condiment is contained in a container such as a bottle with a neck portion which is attached to a dispensing nipple. When the device is hanging upside down, the condiment in the container flows into the dispensing tip, which has a valve such that no fluid flows out the end of the tip until pressure is applied by squeezing the plastic bottle. A dispenser nipple passes through a hole in a plate or tray in a housing. A back resilient pad is on one side of the hole, and on the front side of the hole is a front pad. The dispensing nipple extends through this hole between the two pads. A push rod connects to a push plate on the front side of the front pad, and the application of force on the push rod forces the two pads towards each other. When the nipple is between them, it causes the nipple to be squeezed, thus dispensing condiment out the tip.

6 Claims, 5 Drawing Sheets

PUSH PAD UNIT FOR DISPENSING FLUIDS

BACKGROUND OF THE INVENTION

1. Field of the Invention

This invention relates to apparatus for dispensing liquids such as foods and condiments. It relates especially to a dispensing unit including a housing in which is secured in a vertical fashion different containers of various condiments which can be dispensed through dispensing nipples attached to the container.

2. Background of the Invention

Condiments such as mustard, catsup, mayonnaise, and various other sauces are widely dispensed in restaurants and cafes and especially in the fast food market. Restaurants have various dispensing systems for these condiments, such as catsup bottles or mustard bottles. Some of these bottles are rigid, and others are plastic where they can be squeezed. Many of the fast food restaurants have condiments in small plastic packages. When the customer needs catsup, for example, he tears off a corner of one of the packages and squeezes the product (such as mustard or catsup) onto the sandwich. The use of such packages leaves a lot to be desired. They are very messy, and also waste a lot of condiment being dispensed.

SUMMARY OF THE INVENTION

This invention includes a condiment dispensing unit for holding dispensing bottles, each such dispensing bottle having a flexible nipple attached thereto. The housing includes two sides, a back, and a front which has a door. There is a horizontal shelf in the housing with a plurality of passages therethrough to receive each of the dispensing nipples. Means are provided to maintain the bottles in an upright inverted position. Squeezing means are supported within the housing and adjacent the shelf and operable for squeezing each said nipple to cause the selected nipple to dispense condiment which is in its associated bottle.

In one embodiment, the means for maintaining the condiment bottle in an upright position includes a lower or bottom tray with holes therethrough to receive the dispensing nipple and is in a fixed position within the housing. Slightly above its bottom tray is slide-in tray which has a series of notches on one edge. There is a notch for each dispensing nipple. In this embodiment the bottles are hung upside down on a rod traversing the housing from side to side. After the condiment bottles have been hung and the nipples inserted through the holes in the bottom tray, the slide-in tray is inserted at a position slightly above the bottom tray. The notches then engage the dispensing nipple and help to hold it in a steady position.

Mechanical squeezing means are provided between the bottom tray and the slide-in tray. In one embodiment this includes a back pad of resilient spring-like material positioned at the back side of each dispensing hole in the bottom tray. A front pad of a similar material is positioned on the front side of each said dispensing nipple. Both pads are supported by the bottom tray. There is sufficient room between the two pads when the front pad is in its most front position so that the dispensing nipple can be inserted therebetween. A push plate is just in front of the front pad, and a rod with a pushbutton attached extends through the front of the housing. When one wishes to dispense a condiment, all one has to do is to hold his hot dog (or whatever) beneath the nipple, push in on the button, and the condiment is dispensed. This is neat and saves condiments.

It is an object of this invention to provide a condiment dispensing unit which can dispense any one of a number of condiments without prepackaging of individual size packages.

It is another object of this invention to provide mechanical squeezing means for dispensing condiments from squeezable nipple attached to a condiment container.

These and other objects will become more apparent from the following description taken in conjunction with the drawings in which:

DETAILED DESCRIPTION OF THE PREFERRED EMBODIMENT

Figure 1:
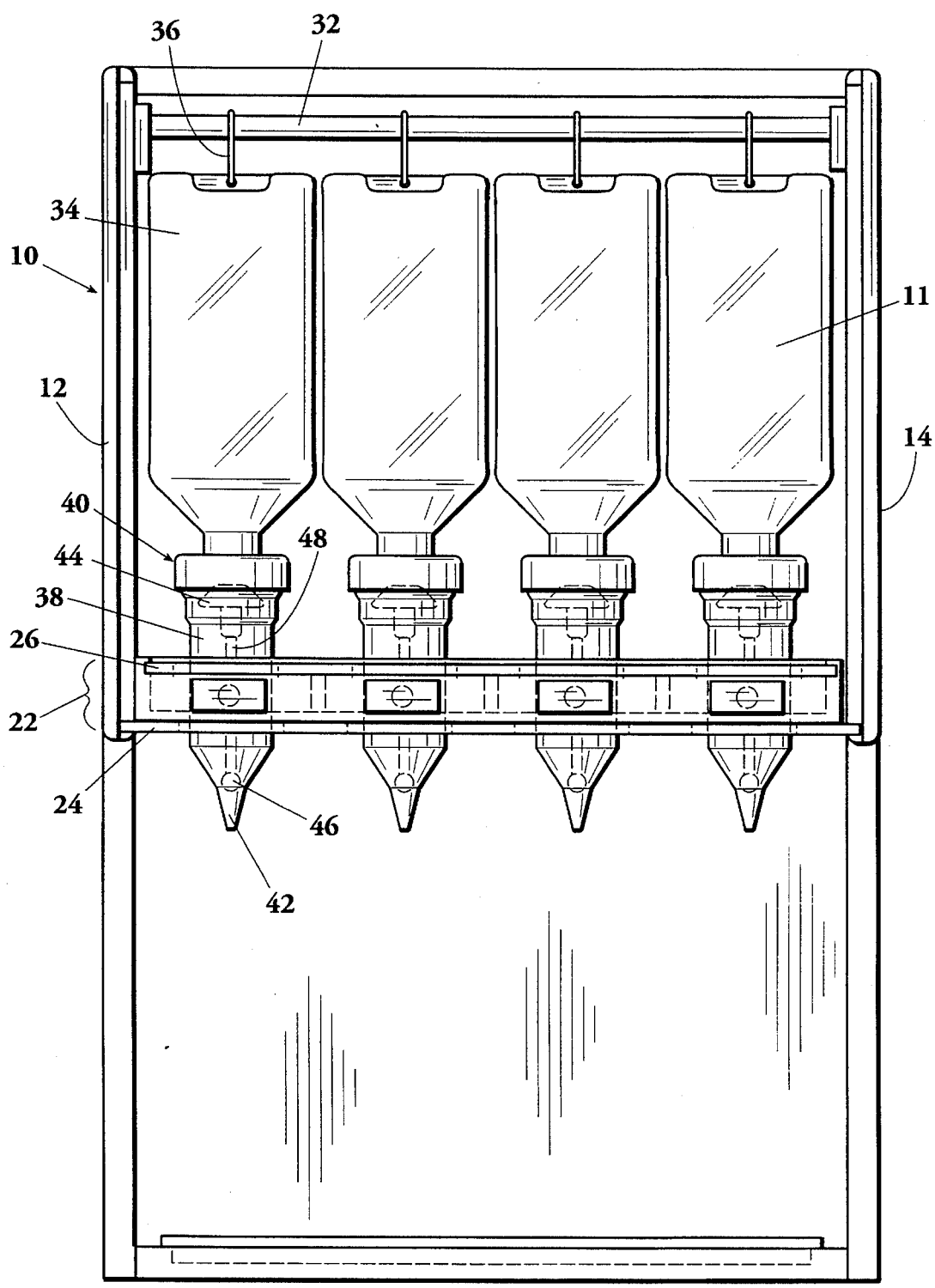
FIG. 1 is a front elevation view of a dispensing unit illustrating the position of condiment storage containers with squeezable nipples and squeezing means for dispersing condiments from the nipple.
Figure 2:
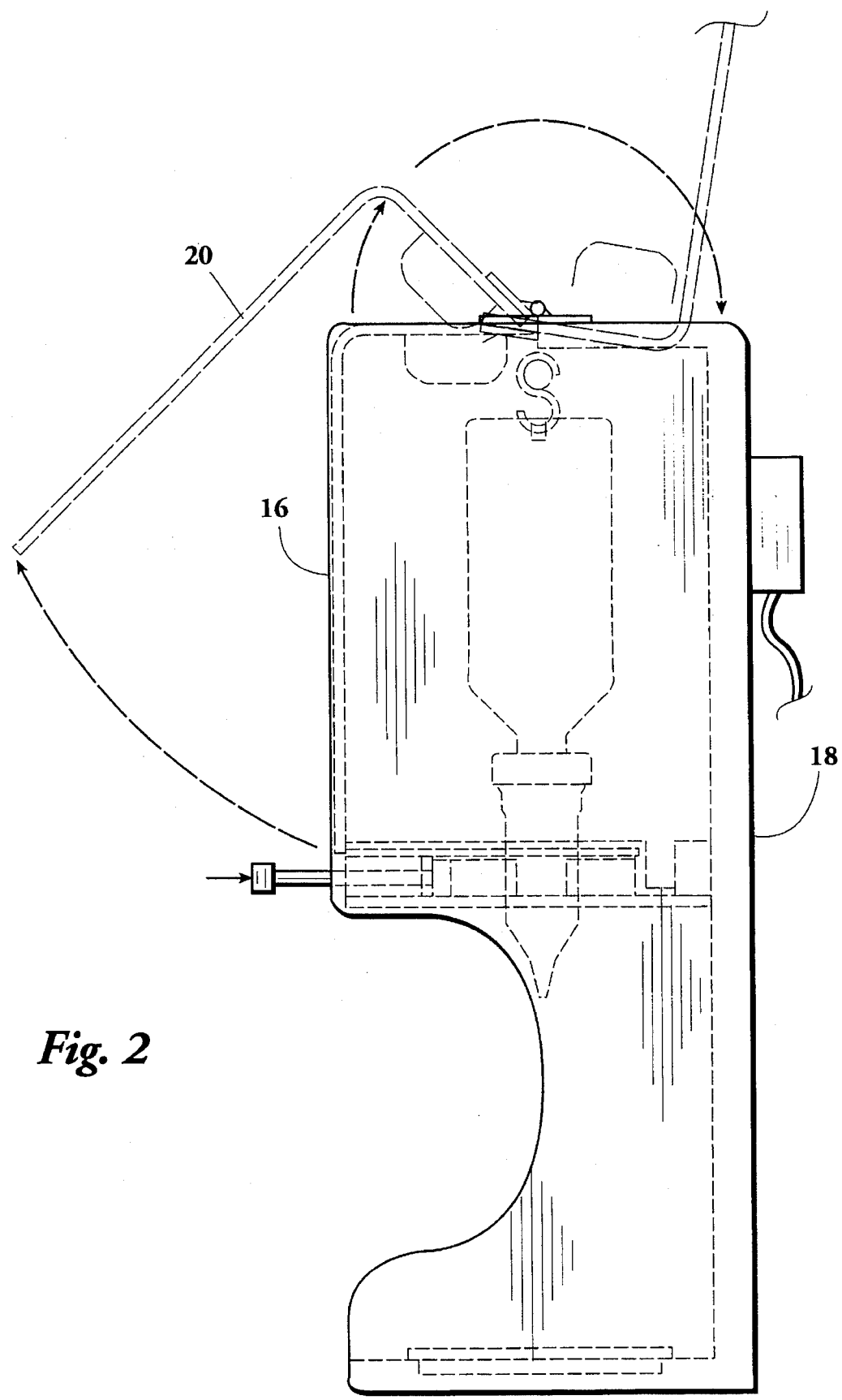
FIG. 2 is a side view illustrating the dispensing unit of this invention.

Attention is first directed to FIGS. 1 and 2 for an overview of the invention. FIG. 1 is a front elevation view, and FIG. 2 is a side elevation view of the condiment dispensing unit of this embodiment. Part of the elements are shown in phantom lines. Shown in FIG. 1 are four condiment containers 11 which would contain whatever condiments, such as mustard, catsup, sauce, and so forth, as might be desired to be dispensed. Soaps or chemicals may also be dispensed. Although four containers and push pad units are shown, it can be constructed as a single container and push pad unit.

These are all supported within housing 10 which has a left side 12, a right side 14, a front side 16, and a back side 18. As shown in FIG. 2, a door 20 closes the front of the housing. The door may include a lighted display unit. There is a bottom tray 24 which is preferably fixed to the housing 10. There is a slide-in tray 26 which slides in and out of the unit and is spaced about the bottom tray. Between the bottom tray 24 and the slide-in tray 26 is a squeezing unit 22 which is used to squeeze nipple 38 to dispense a selected condiment or fluid. A cooling unit 45 may also be included.

Figure 3:
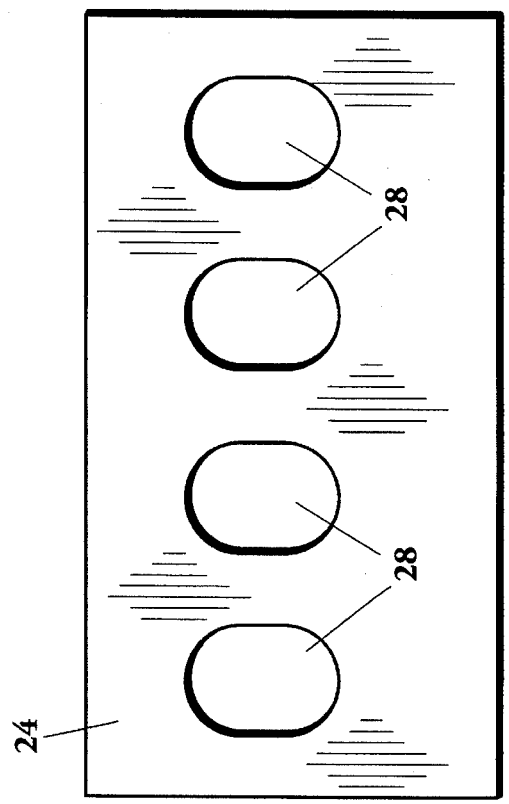
FIG. 3 is a plan view of the bottom tray of FIG. 1.
Figure 4:
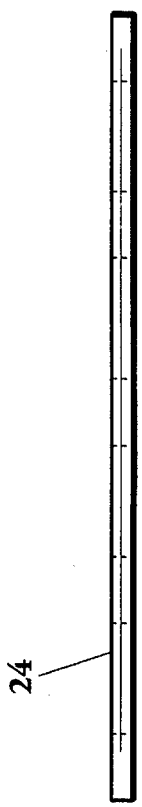
FIG. 4 is a front elevation of the bottom tray of FIG. 3.

Attention is now directed to FIGS. 3 and 4 to show a plan view of the bottom tray 24 having holes 28 therethrough. Attention is also directed to FIGS. 5 and 6 to show a plan view and front elevation, respectively, of the slide-in tray 26 which has open slots 30 opening to the back. Now back to FIG. 1, a support rod 32 is supported at the top and on the inside of housing 10. Suspended from there are shown four dispensing containers of condiments which are suspended from the rod 32 by hooks 36. Other means of supporting the container may be used. Attention is also directed to FIG. 9 to more clearly see the details. Attached to the bottom of each container 34 is a dispensing unit which includes a squeezable nipple 38 and is connected by a connector 40 to the inverted end of the condiment storage container 34. The squeezable nipple 38 has a lower dispensing tip 42 which has an opening at the lower end. Internally of the nipple 38 is a valve mechanism including a valving arrangement to open and close the tip such that when the squeezable bottle 38 is squeezed, the tip 42 is opened; and when the bottle is not squeezed, the tip is closed. This includes a lower valve 46 connected by a rod 48 to an upper umbrella-like structure 44.

Figure 9:
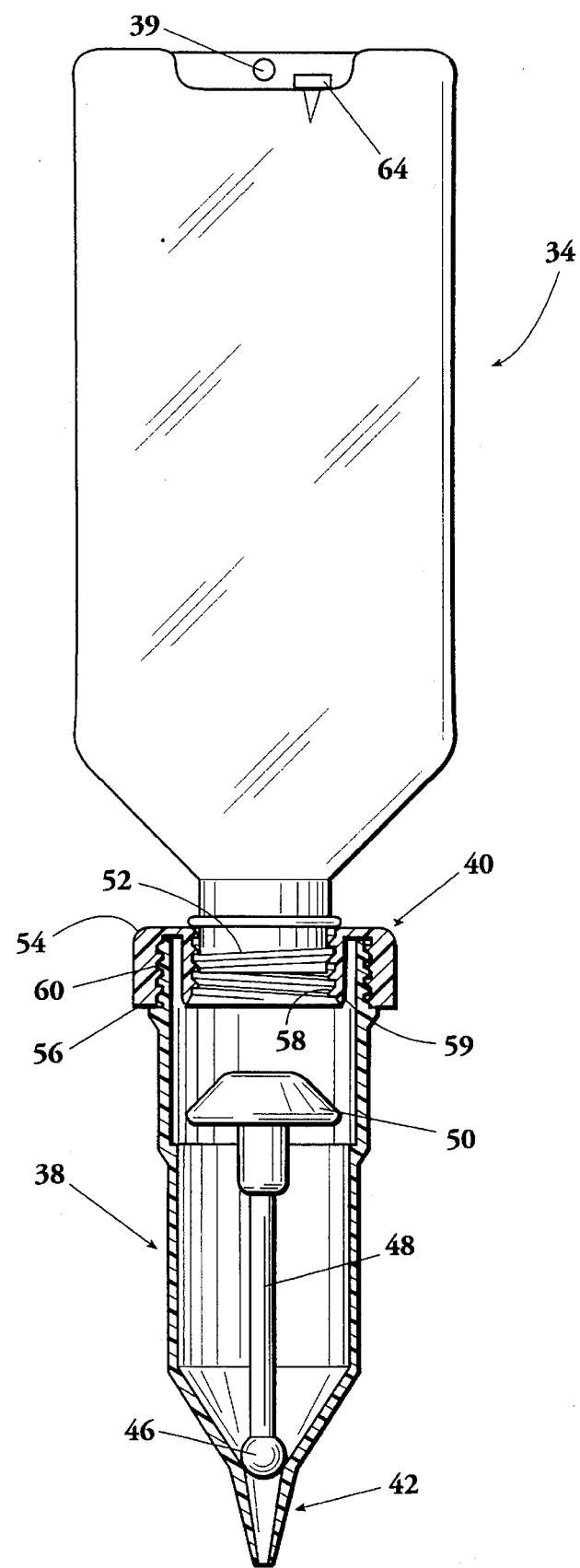
FIG. 9 is a front view, partly in section, of a suitable condiment container and a squeezable nipple with valve mechanism.

Attention is directed to FIG. 9 which shows in more detail the squeezable bottle 38 and its connections to the condiment container 34 which is supported through holes 39 and hooks 36 to rod 32. An air vent plug 64 is also provided. A connector connects the condiment storage container 34 to the squeezable nipple 38. This includes two concentric rings, outer annular ring 56, and inner annular member 59 which has internal threads 58 on it as does the outer ring 56 which has threads 60 thereon. Threads 38 connect to threads 52 of the neck of the container. There is a valve element within the squeezable nipple 38 which includes a ball, spear, or other type valve 46 which seals against the inner part of tip 42 when valve 46 is in its lowest position. Valve 46 is connected by an elongated member 48 to an umbrella-shaped member 50. When there is no pressure put on nipple 38, the valve 46 is in the position shown in FIG. 9. When the nipple 38 is squeezed, the condiment therein forces the umbrella shaped member 44 upwardly sufficiently to open valve 46 so that the condiment can flow out hole 41 in tip 42. When squeezed, however, umbrella-shaped member 44 does not contact inner annular member 59 so that the flow of condiment from container 34 into nipple 38 will not be restricted. Thus one function of umbrella structure 27 is to lift valve 46 off its seat when the nipple is squeezed when the container is in the position shown in FIGS. 1 and 2. The umbrella structure 44 is typically shaped like a truncated cone in which the largest diameter is small enough to permit flow of the selected condiment between the structure 44 and the inner wall of the nipple 38 but big enough to have an area on its downside surface sufficiently large so that when the filled nipple is squeezed it is moved up enough to open valve 46.

Figures 7, 8:
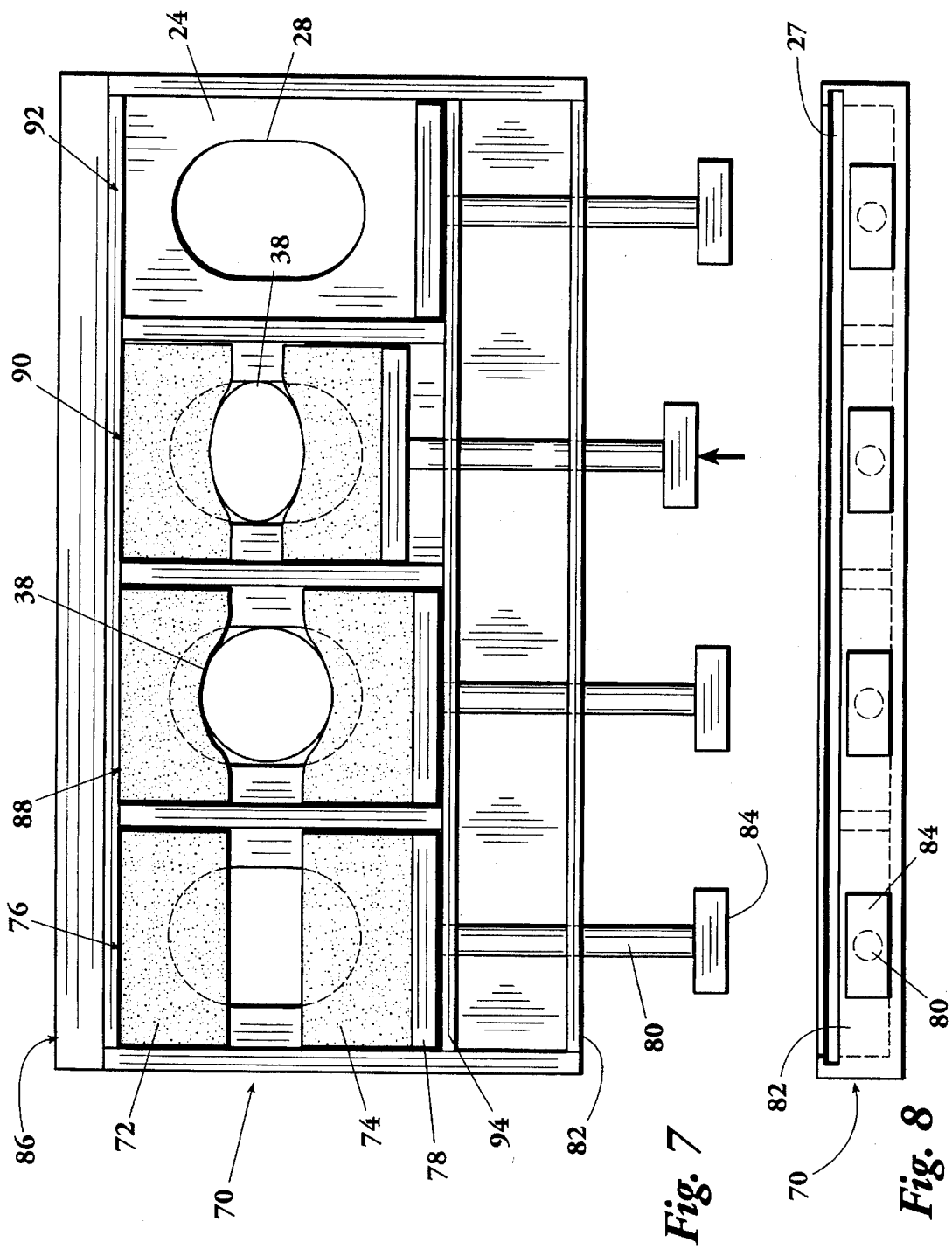
FIG. 7 is a plan view showing only the squeezing mechanism used with the dispensing unit of FIG. 1.
FIG. 8 is a front elevation view of the squeezing unit of FIG. 7.

Attention is next directed to FIGS. 7 and 8 which show the squeezing means for the apparatus of FIG. 1. Shown thereon are four squeezing units 76, 88, 90, and 92. No nipple is in unit 76. Unit 88 has a nipple 38 but is not squeezed. In unit 90, nipple 38 is illustrated as being squeezed. Unit 92 has no squeeze pads shown. Each unit contains essentially the same construction. That includes a back pad 72 which fits against the back 86 of the housing. A front pad 74 is positioned at the front of the unit 76. A push plate 78 is provided at the front of pad 72 and has a push rod 80 which extends through pad frame 94 and front frame 82. The rod 80 has a push button 84 thereon. Slide tray 26 is not shown in FIGS. 7 and 8 so that a clear view may be made of the push pads. FIG. 8 shows slot 27 empty; but in use, slide tray 26 would be inserted therein.

Figure 5:
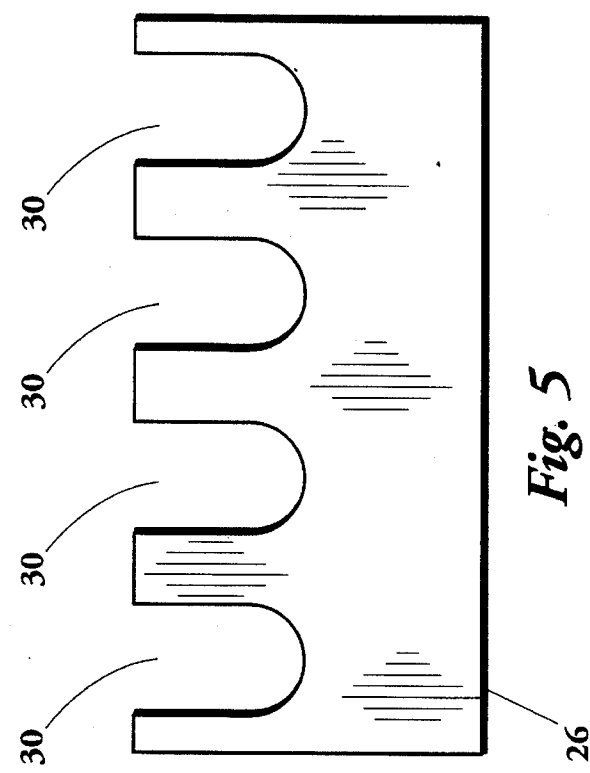
FIG. 5 is a plan view of the slide-in tray for use in the embodiment of FIG. 1.
Figure 6:
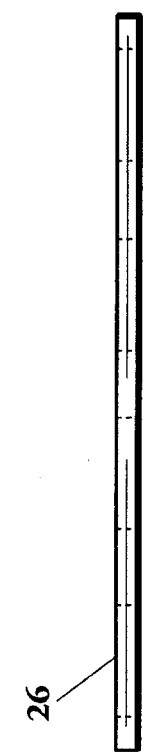
FIG. 6 is a front elevation of the slide-in tray of FIG. 5.

Each pad 72 and 74 is made of resilient plastic which has sufficient resistance to permit the bottle to be squeezed, yet will return to its position shown in squeeze unit 76. The back pad 72 and front pad 74 are similar resilient spring-like material, and they are spaced a sufficient distance on the front side of the dispensing nipple so that there is sufficient room between the two pads so that the dispensing nipple can be inserted therebetween when in the position shown by unit 76. The push pad assembly of FIGS. 7 and 8 is then inserted into the unit of FIG. 1. In operation, a squeezable nipple 38 is inserted through each squeezing unit as shown in FIG. 1. Either one or all, or any number, of the push units can be used. After the desired number of squeezable nipples 38 are inserted, the slide-in tray of FIGS. 5 and 6 is slid into it and takes the position shown in FIG. 1. In FIG. 7 there is no bottle or nipple inserted into unit 76 but a nipple is shown inserted into push units 88 or 90. There is no squeezing action yet on the nipple in unit 88, so no condiment will flow out as valve 46 will still be closed. However, in unit 90 the pushbutton has been pushed in, thus squeezing the squeezable nipple 38 so that valve 46 is open and condiment comes out tip 42. By selectively designing the tip and the opening of the tip 42 in conjunction with the front pads 74 and back pads 72, the travel of the push rod 80, a quantity of condiment can be dispersed with one push. When one wishes to have a condiment such as mustard put on one's hot dog, or whatever, the hot dog is held under the tip 42 and the selected pushbutton 84 pushed in. The selected condiment will continue to flow from tip 42 as long as the pushbutton 84 is pushed in. When one releases force on the push button 84, the resistance of pads 72 and 74 will return the bottom to its normal position as shown in FIG. 7, unit 88. Other means of biasing rod 80 outwardly, such as springs, may be used. It is anticipated that the dispensing unit will be designed such that one push will satisfy most patrons. Push unit 92 is shown with no bottles, no nipples, and no pads therein. This is merely to show the relationship there.

This unit saves condiments lost or wasted in previous systems. It also has improved sanitation.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A dispensing unit for holding at least one dispensing bottle, each having a flexible dispensing nipple with a hole in the end which comprises;

a housing having a front and a back;

a bottom tray fixed to said housing with at least one passage therethrough to receive a dispensing nipple;

a slide-in tray spaced above said bottom tray and having at least one notch opening toward the back edge and of a depth such that when the slide-in tray is pushed in, the notch aligns with a corresponding passage of the bottom tray;

a squeezing means supported within said housing between said bottom tray and said slide-in tray and includes a) a back pad of a resilient sponge-like material, and b) a front pad toward the front portion of said housing and positioned between said trays, there being sufficient room between the two pads when relaxed so that a dispensing nipple can be placed therebetween; and means operable to force such front pad towards its corresponding back pad.

2. A dispensing unit as defined in claim 1 in which the means to force one pad toward the other includes a movable plate spaced adjacent the front of said front pad, a rod extending through the plate to the front, and a button at the outer end of said rod so that when the button is pushed, the plate will compress one pad toward its corresponding other pad, thus squeezing the dispensing nipple and forcing out a selected condiment.

3. A condiment dispensing unit as defined in claim 2 including a cooling unit within said housing.

4. A condiment dispensing unit as defined in claim 3 including a display panel in said door and a light within said housing for illuminating said display panel.

5. A dispensing unit as defined in claim 1 including a rod transversely supporting the top of an inside said housing for supporting said dispensing bottle above said passage.

6. A dispensing unit for holding dispensing bottles, each having a flexible dispensing nipple with a hole in the end which comprises;

a housing having a front and a back;

a bottom tray fixed to said housing with a plurality of passages therethrough to receive each said dispensing nipple;

a slide-in tray spaced above said bottom tray and having a plurality of notches opening toward the back edge and of a depth such that when the slide-in tray is pushed in the notch aligns with a corresponding passage of the bottom tray;

a squeezing means supported within said housing between said bottom tray and said slide-in tray and includes a) a back pad of a resilient sponge-like material, there being one such pad supported between said slide-in tray and said bottom tray at the back of said housing for each dispensing bottle; b) a front pad toward the front portion of said housing and positioned between said trays, there being sufficient room between the two pads when relaxed so that the dispensing nipple can be placed therebetween; and means operable to force each said front pad towards its corresponding back pad.

* * * * *